(12) United States Patent
Mekkattuparamban et al.

(10) Patent No.: US 9,379,973 B2
(45) Date of Patent: Jun. 28, 2016

(54) BINARY COMPATIBLE EXTENSION ARCHITECTURE IN AN OPENFLOW COMPLIANT NETWORK ENVIRONMENT

(71) Applicants: Joji T. Mekkattuparamban, Sunnyvale, CA (US); Kyle A. D. Mestery, Woodbury, MN (US)

(72) Inventors: Joji T. Mekkattuparamban, Sunnyvale, CA (US); Kyle A. D. Mestery, Woodbury, MN (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 279 days.

(21) Appl. No.: 13/764,174

(22) Filed: Feb. 11, 2013

(65) Prior Publication Data

US 2014/0226661 A1 Aug. 14, 2014

(51) Int. Cl.
*H04L 12/58* (2006.01)
*H04L 12/741* (2013.01)
*H04L 12/931* (2013.01)

(52) U.S. Cl.
CPC .............. *H04L 45/74* (2013.01); *H04L 49/70* (2013.01)

(58) Field of Classification Search
CPC ......... H04L 45/00; H04L 45/74; H04L 49/00; H04L 49/65; H04L 49/70
See application file for complete search history.

(56) References Cited

U.S. PATENT DOCUMENTS

| 2012/0324442 | A1* | 12/2012 | Barde ................................ 718/1 |
| 2013/0155861 | A1* | 6/2013 | Bryers et al. .................. 370/235 |
| 2015/0067674 | A1* | 3/2015 | Melander et al. ................ 718/1 |

OTHER PUBLICATIONS

Prabhakar, et al., "Designing a Multicast Switch Scheduler," Proceedings of the 33rd Annual Allerton Conference, Urbana-Champaign, No month, 1995, 10 pages.
Carbone, et al., "Improving the performance of Open vSwitch," Proceedings of the EuroBSD Conference, Maarssen, The Netherlands, May 30, 2011, 4 pages.
Open Network Foundation (OFN), "OpenFlow Switch Specification," Version 1.0.0 (Wire Protocol 0x01), Dec. 31, 2009, 42 pages; www.openflow.org.
Open Network Foundation (OFN), "OpenFlow Switch Specification," Version 1.1.0 Implemented (Wire Protocol 0x02), Feb. 28, 2011, 56 pages; www.openflow.org.
Open Network Foundation (OFN), "OpenFlow Switch Specification," Version 1.3.1 (Wire Protocol 0x04), Sep. 6, 2012, 128 pages; www.openflow.org.
McKeown, et al., "OpenFlow: Enabling Innovation in Campus Networks," Mar. 14, 2008, 6 pages; www.openflow.org.
Simon Norman, "An Introduction to Open vSwitch," presentation, LinuxCon, Japan, Yokohama, Jun. 2, 2011, 36 pages.
Dan Pitt, "SDN Standards: What and Whatnot," Open Network Foundation (ONF), Santa Clara, California, Apr. 17, 2012, 15 pages.
Open Network Foundation (ONF), "Software-Defined Networking: The New Norm for Networks" White Paper, Apr. 13, 2012, 12 pages; www.opennetworking.org.

* cited by examiner

*Primary Examiner* — Feben M Haile
(74) *Attorney, Agent, or Firm* — Patent Capital Group

(57) ABSTRACT

An example method for a binary compatible extension architecture in an OpenFlow compliant network environment is provided and includes receiving a packet on an extension port from an Open vSwitch (OVS) component of a virtual switch configured for an OpenFlow protocol, performing fast path processing on the packet in a kernel space under control of a switch data path in a user space; and sending the packet on the extension port for a subsequent delivery to its destination from an output port of the virtual switch.

17 Claims, 7 Drawing Sheets

FIG. 4
```
efdb_get_ingress_key(packet_t *context);
efdb_get_egress_key(packet_t *context);                    /* 78
/* Returns the flow-id, if found or -1 if not found */
efdb_find_flow(uint8 *key);
efdb_delete_flow(int flow-id);
efdb_alloc_flow(uint8 *key);
```

FIG. 5
```
                                                    80
typedef struct extn_act_s_ {
    uint16 act_id;    /* action identifier */
    uint16 data_len;  /* length of opaque action data */
    uint8 data[0];    /* opaque data used by action routine */
} extn_act_t;

typedef struct action_list_s {
    int list_len;     /* total length of list */
    uint8 list[0];    /* variable len payload of extn_act_t */
} action_list_t;

sw_extn_add_flow (int ing_flow_id, act_list_t *al, int egr_flow_id, uint8 *orig_dmac);
sw_extn_del_flow (int ing_flow_id, int egr_flow_id);
sw_extn_get_flow (int ing_flow_id, int egr_flow_id);
```

FIG. 6
```
                                                    82
int my_fp_func (int action_id, int *flow_id, void *config_data, struct sk_buff *skb)
enum {
N1K_FLOW_NEW,      /* The packet modified, and a new flow-id returned. */
N1K_FLOW_CONTINUE, /* No packet modification - continue with next action */
N1K_FLOW_PUNT,     /* Pkt was punted to slow path */
N1K_FLOW_DROP      /* Pkt was dropped */
}
```

BINARY COMPATIBLE EXTENSION ARCHITECTURE IN AN OPENFLOW COMPLIANT NETWORK ENVIRONMENT

TECHNICAL FIELD

This disclosure relates in general to the field of communications and, more particularly, to a binary compatible extension architecture in an OpenFlow compliant network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance. In such data centers and similar networking environments, software defined networking (SDNs) with open source software architecture, such as OpenFlow, are being increasingly used. Interfaces between OpenFlow compliant architecture and existing proprietary systems can impact operational efficiency and utilization of resources if not properly addressed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified diagram illustrating yet other example details of the communication system in accordance with an embodiment;

FIG. 5 is a simplified diagram illustrating yet other example details that may be associated with an embodiment of the communication system;

FIG. 6 is a simplified diagram illustrating yet other example details that may be associated with an embodiment of the communication system;

DETAILED DESCRIPTION OF EXAMPLE EMBODIMENTS

Overview

An example method for binary compatible extension architecture in an OpenFlow compliant network environment is provided and includes receiving a packet on an extension port from an Open vSwitch (OVS) component of a virtual switch configured for an OpenFlow protocol, performing (e.g., per-flow) fast path processing on the packet in kernel space under control of a switch data path in user space, and sending (e.g., moving, communicating, etc.) the packet back to the OVS component on the extension port. The OVS component may send the packet to its destination from an output port of the virtual switch. In a specific embodiment, if the packet is a first one of a flow, the method further includes moving the packet to the switch data path, with the switch data path determining an action to be performed on the packet based on flow definitions and corresponding actions configured in the switch data path, and retrieving a flow record including an ordered list of the actions corresponding to the flow. "Moving" as used herein, includes any type of communicating, manipulating, sending, etc. the packet from the kernel space to the user space. The fast path processing includes executing the list of actions in the flow record.

EXAMPLE EMBODIMENTS

Figure 1:
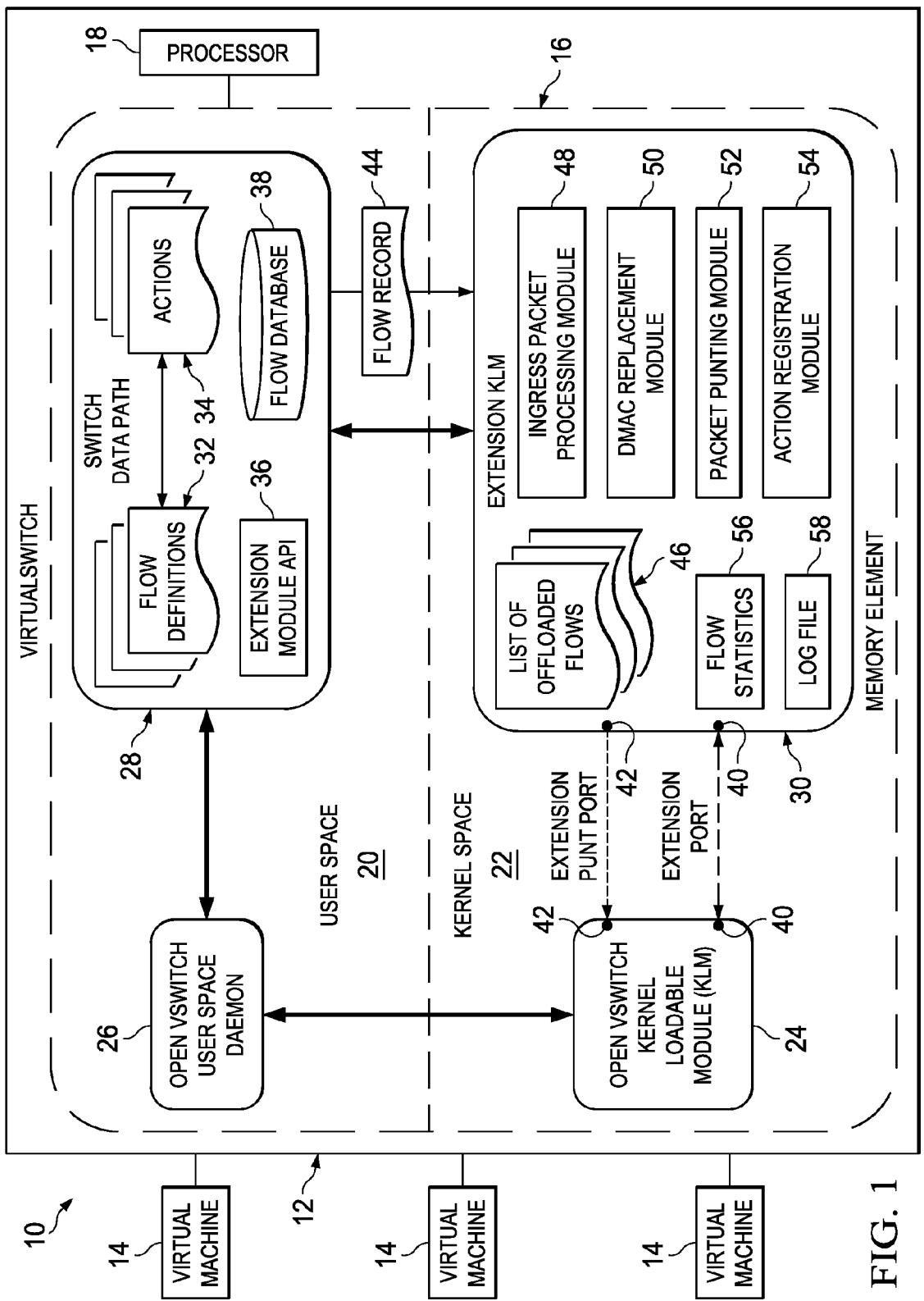
FIG. 1 is a simplified block diagram illustrating a communication system for binary compatible extension architecture in an OpenFlow compliant network environment.

Turning to FIG. 1, FIG. 1 is a simplified block diagram illustrating a communication system 10 for binary compatible extension architecture in an OpenFlow compliant network environment. A virtual switch 12 enables network connectivity for one or more virtual machines (e.g., software implementation of a physical computing device) 14 in a virtual network. Virtual switch 12 includes a memory element 16 and a processor 18. Memory element 16 includes a user space 20 and a kernel space 22. As used herein, the term "kernel space" includes a segregation of space in the memory element where privileged operating system processes such as kernels, kernel extensions, kernel modules and device drivers are executed. Processes executing in the kernel space typically have access to substantially all memory and machine hardware. The term "user space" includes another distinct segregation of space in the memory element where non-privileged processes, such as user mode applications execute. Each user space process normally runs in its own virtual memory space, and, unless explicitly requested, cannot access the memory of other processes. In typical operating systems, system calls act as an interface between user processes (e.g., processes that execute in user space) and kernel processes (e.g., processes that execute in kernel space).

Packets from and to virtual machines 14 may be received at an Open vSwitch (OVS) kernel loadable module (KLM) 24 (executing in kernel space 22), which may communicate with a corresponding OVS user space daemon 26 (executing in user space 20). (In a general sense, a KLM is kernel code that has been loaded in the kernel space after the kernel has booted.) OVS KLM 24 and OVS user space daemon 26 are OVS components that may together form the OVS in virtual switch 12. A switch data path 28 (executing in user space 20) may communicate with and control OVS user space daemon 26. An extension KLM 30 (executing in kernel space 22) may communicate with switch data path 28.

In various embodiments, switch data path 28 may include flow definitions 32 and corresponding actions 34 configured therein. As used herein, the term "flow definitions" include characterization of flows, for example, properties and values thereof that define one or more flows. A "flow" is the set of unidirectional Internet Protocol (IP) packets having common characteristic properties including source IP address, source Transmission Control Protocol (TCP) port, etc. that pass through an observation point (e.g., network interface) during a certain time interval. Substantially all network packets belonging to a specific flow may have a set of common properties. A specific flow may be identified by any combination of properties, including Tunnel ID; IPv6 ND target; IPv4 or IPv6 source address; IPv4 or IPv6 destination address; Input port; Ethernet frame type; VLAN ID (802.1Q); TCP/UDP source port; TCP/UDP destination port; Ethernet source address; Ethernet destination address; IP Protocol or lower 8 bits of ARP code; IP ToS (DSCP field); ARP/ND source hardware address; ARP/ND destination hardware address; etc.

A packet may be characterized as belonging to a particular flow if it satisfies substantially all properties of that flow. In some embodiments, flow definition 32 may include a data structure with appropriate flow properties and corresponding values. As used herein, the term "action" includes a network management or service performed on a network packet, including no packet modification, packet encapsulation, packet decapsulation, packet cloning, etc. Actions 34 may be defined in any appropriate manner for specific flows. Switch data path 28 may also include an extension module application programming interface (API) 36 and a flow database 38.

Various embodiments of communication system 10 may implement feature offloading to fast path (e.g., processing occurring in kernel space 22) on extension KLM 30 that attaches to OVS KLM 24 at a switch-port level. As used herein, the term "offload" includes transfer data from one device (e.g., OVS KLM 24) to another (e.g., extension KLM 30), and can include passing on, delegating, forwarding, conveying, sending a packet from one device to another. Extension KLM 30 may be controlled by switch data path 28 from a slow path (e.g., processing occurring in user space 20). A header rewrite may be used on one or more dedicated ports (e.g., extension port 40 and extension punt port 42) to pass per-flow opaque data (e.g., data that is incompletely defined at an interface, such as a port, so that manipulating its value may require calling subroutines (e.g., program code; sequence of instructions designed to perform a particular function within a software program) that have access to the missing information; the concrete representation of the data type may be hidden from users) between extension KLM 30 and OVS KLM 24. As used herein, the term "port" refers to a process specific software construct serving as a communications endpoint.

A flow record 44 related to the offloaded flow may be obtained by extension KLM 30 from switch data path 28. Flow record 44 comprises an ordered list of actions and at least one property (e.g., destination media access control (DMAC) address) that can identify the associated packets of the flow. In some embodiments, extension KLM 30 may store flow information (e.g., obtained from flow record 44) in a list of offloaded flows 46. An ingress packet processing module 48 may process the received packets according to desired needs. Extension KLM 30 may further include a destination media access control (DMAC) replacement module 50, a packet punting module 52, an action registration module 54, flow statistics 56, and a log file 58.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

SDN is a form of network virtualization in which the control plane is separated from the data plane and implemented in a software application. In the SDN architecture, the control and data planes are decoupled, network intelligence and state are logically centralized, and the underlying network infrastructure is abstracted from the applications. This architecture allows network administrators to have programmable central control of network traffic without requiring physical access to the network's hardware devices. SDN virtual networking combined with virtual compute (VMs) and virtual storage can emulate elastic resource allocation.

OpenFlow is a standard (open source software) communications interface defined between the control and forwarding layers of an SDN architecture. OpenFlow allows direct access to and manipulation of the forwarding plane of network devices such as switches and routers, both physical and virtual (hypervisor-based). Most open source hypervisors include an OpenFlow compliant virtual switch that allows network connectivity to virtual machines residing on the hypervisors. The OpenFlow protocol is implemented on both sides of the interface between network infrastructure devices and the SDN control software. OpenFlow uses the concept of flows to identify network traffic based on pre-defined match rules that can be statically or dynamically programmed by the SDN control software. It also allows definitions of traffic flow through network devices based on parameters such as usage patterns, applications, and cloud resources.

OVS is a software implementation of a virtual switch, designed to be configurable and compatible with common protocols, including the OpenFlow protocol. OVS typically consists of user space daemons (e.g., OVS user space daemon 26) and kernel loadable modules (KLMs) (e.g., OVS KLM 24) provided by a user consortium (www.openvswitch.org). Each host (e.g., virtual machine, server, etc. that hosts applications) in the network may include an instance of OVS in its user space and kernel space. A centralized OpenFlow controller may (remotely or locally) manage (e.g., configure, monitor, etc.) multiple OVS in disparate hosts. The OVS is configured to enable massive network automation through programmatic extension, while still supporting standard management interfaces and protocols (e.g. NetFlow, sFlow, SPAN, RSPAN, CLI, LACP, 802.1ag). In addition, it is designed to support distribution across multiple physical servers.

In a general sense, the OVS routes packets between network interfaces (e.g., ports) in a virtual network. In software, the switching function of the OVS can be represented by an object called datapath, which contains a list of ports used by the OVS, and a flow table that associates a specific action (e.g., forward, drop, etc.) to each flow. Each packet flowing through the OVS is compared against the entries in the flow table, and if there is a match, the corresponding action is executed. The software architecture of the OVS includes a separation between the OpenFlow controller (in charge of managing ports and computing the content of the flow tables), and the datapath, which does the actual packet switching. The two components can run on different systems, and, as a consequence, the datapath can be implemented with various technology including software and hardware.

In some implementations of the OVS, the OVS user space daemon includes a library (that implements the OpenFlow protocol) and communication modules (that handle communication with network devices provided by the OVS kernel module). The OVS user space daemon evaluates flow rules (provided by the OpenFlow controller) to determine destination of each packet and pushes the flow rules down into the OVS kernel module as appropriate. Communication with the OpenFlow controller may be via a management protocol (e.g., port 6632/TCP) and OpenFlow protocol (e.g., port 6633/TCP). The OVS user space daemon may connect to the central OpenFlow controller for distributed coordination and control.

The OVS KLM typically implements a control interface allowing the OVS user-space daemon to make routing decisions for the OVS KLM. The flow table may be implemented in the OVS KLM allowing faster processing of traffic compared to traffic processing in user space. The OVS KLM interacts with the OVS user space daemon through a NetLink socket (e.g., communication protocol between kernel space and user space processes). When the OVS KLM receives a packet on one of its interfaces, it generates a flow key describing the packet in general terms.

If the OVS KLM does not know how to process the packet (e.g., packet is first of a flow), the packet is typically passed to the OVS user space daemon, along with the generated flow key. The first packet is processed by the OVS user space daemon according to rules provided by the OpenFlow controller. Generally, the OVS user space daemon may also pass a rule back to the OVS kernel module describing how to handle related packets in the future. (Processing by the OVS user space daemon is referred to as a "slow path" due to the relatively longer time for packet processing in user space compared to kernel space processing times. Packet processing in kernel space may be referred to as "fast path" processing.)

The rules may start with the flow key and include a set of associated actions. Possible actions include: output the packet to a specific port, forwarding it on its way to its final destination; send the packet to user space for further consideration; make changes to the packet header on its way through (e.g., network address translation); add an 802.1Q virtual LAN header in preparation for tunneling the packet to another host; record attributes of the packet for statistics generation; etc. Once a rule for a given type of packet has been installed into the OVS kernel module, future packets can be routed quickly without the need for further user-space intervention.

In general, in the OpenFlow architecture, the user-space controller manages traffic through the OVS on a per-flow basis. The architecture allows the controller to be the default recipient of all traffic, thus allowing the controller to implement features in the slow path. Features for existing OVS include: visibility into inter-VM communication via NetFlow, sFlow(R), Switch Port Analyzer (SPAN), RSPAN, and Generic Routing Encapsulation (GRE) tunneled mirrors; Link Aggregation Control Protocol (LACP) (IEEE 802.1AX-2008); standard 802.1Q VLAN model with trunking; fine-grained Quality of Service (QoS) control; per VM interface traffic policing; network interface card (NIC) bonding with source-MAC load balancing, active backup, and L4 hashing; OpenFlow protocol support (including many extensions for virtualization); IPv6 support; multiple tunneling protocols (Ethernet over GRE, Control and Provisioning of Wireless Access Points (CAPWAP), IPsec, GRE over IPsec); remote configuration protocol with local python bindings; kernel and user-space forwarding engine options; etc. However, the architecture does not provide the ability to offload features to the fast path, unless the feature is implemented in the OVS itself (e.g., by modifying the source code of the OVS to include feature compatible code).

Often, it is desirable to supplement the OVS to provide more advanced features (e.g., encapsulated remote switch port analyzer (ERSPAN)) that are on par with commercial virtual switches (e.g., Cisco Catalyst 6500) in the fast path. For example, VXLAN is a method for floating virtual domains on top of a common networking and virtualization infrastructure. It is typically configured in proprietary systems (e.g., VMWare and Cisco networks), and cannot be ported (under existing methods) to open source software architecture such as OpenFlow supported OVS without additional administrative and overhead costs. Replacing the hypervisor virtual switch, or directly modifying the open source code of the OVS (e.g., adding appropriate support to the OVS itself) to make the desired enhancements can have major drawbacks of maintenance cost and administrative overhead. Moreover, these approaches have the drawback that all such additions to the OVS have to be coordinated with the OVS community or alternatively, private changes to OVS are maintained separately.

Communication system 10 is configured to address these issues (and others) in offering a system and method for binary compatible extension architecture in an OpenFlow compliant network environment. Embodiments of communication system 10 include an enhancement to existing OVS architecture, where the enhancement includes extension KLM 30 that attaches to the pre-existing OVS switch components, including OVS KLM 24 at the switch-port level and maintains binary compatibility. Extension KLM 30 may perform per-packet fast path processing under the control of a more intelligent switch data path 28 (executing in user-space 20) that handles per-flow processing and offloads the flow to extension KLM 30. In some embodiments, switch data path 28 may be a part of the controller. In other embodiments, switch data path 28 may be tightly coupled to the controller. The controller, through switch data path 28 may program features on a per-flow basis within kernel space 22.

During operation, extension KLM 30 may receive a packet on extension port 40 from OVS KLM 24 of virtual switch 12 configured for an OpenFlow protocol. Ingress packet processing module 48 in extension KLM 30 may perform per-flow fast path processing on the packet in kernel space 22 under control of switch data path 28 in user space 20. Extension KLM 30 may send the packet back to OVS KLM 24 on extension port 40. OVS KLM 24 may send the packet to its destination from an output port of virtual switch 12.

When switch data path 28 determines that a flow should to be processed by extension KLM 30, switch data path 28 may program OVS user space daemon 26 to direct packets of the flow to extension KLM 30 via dedicated extension port 40. Switch data path 28 may also program the corresponding return flow that arrives from extension KLM 30 on extension port 40 and program OVS user space daemon 26 to direct the return packet to the appropriate output port of virtual switch 12.

For every packet flow that is offloaded, the OVS (comprising OVS user space daemon 26 and OVS KLM 24) sees two flows, called the extension ingress flow (EIF) and extension egress flow (EEF). In some embodiments, to co-ordinate the operation of OVS user space daemon 26 and OVS KLM 24 with extension KLM 30, switch data path 28 may program the OVS to rewrite the DMAC address value with a per-flow opaque data. The opaque data can include a unique EIF identifier (ID) that can be useful in uniquely identifying the flow within virtual switch 12. In some embodiments, the packets of the return flow from extension KLM 30 to OVS KLM 24 may be rewritten to replace the DMAC address value with a unique EEF ID. In other embodiments, a combination of opaque data and extension port 40'identifier can uniquely identify the return flow within virtual switch 12. Both the OVS and extension KLM 30 can restore the original DMAC address value using the per-flow data provided by switch data path 28.

For defining the EIF within the OVS, the original packet header may be saved in an appropriate data structure, for example, by a header save subroutine (e.g., PACKET_PARSE_BASIC subroutine), which saves L2 and L3 packet headers in the OVS. If any other packet header fields are to be parsed and modified by a feature (e.g., encapsulation, or other network service feature), then the feature may invoke another subroutine (e.g., PLATFORM_SAVE_HEADER (CONTEXT, FIELD_ID)), which may depend on the context (e.g., computing environment of the flow such as application generating the flow; status of the flow; set of flow properties characterizing the status or environment of the flow; etc.) of the flow.

In addition to the packet header itself, a HEADERS_USED field from a context (e.g., application scenario) may also used for flow definitions 32 (e.g., to identify a specific flow). If the HEADERS_USED field is reset (e.g., when an encapsulation or decapsulation is applied to the packet), the HEADERS_USED field may be saved by invoking another appropriate subroutine (e.g., PLATFORM_APPLY_INGR_MASK (CONTEXT)), which can depend on the context (e.g., specific header saved according to context of the flow). In another embodiment, the EEF ID may use the final header (e.g., with encapsulation and/or other features added appropriately) and HEADERS_USED field from the context.

Such architecture and operations can allow features that involve tunneling or encapsulation, such as VXLAN, to be offloaded in a straight forward manner. Moreover, packets may be directed to multiple recipients with different feature sets on each output port. Embodiments of communication system 10 can retain binary compatibility, while allowing the OVS to be enhanced via extension KLM 30.

According to some embodiments, two reserved ports (extension port 40 and extension punt port 42) may be used for forwarding packets between the OVS and extension KLM 30. Extension port 40 may be used for a normal (e.g., usual, typical, standard, regular, common) flow of packets to extension KLM 30 and the corresponding return flow from extension KLM 30 back to the OVS. In some cases, extension KLM 30 may punt packets back to the OVS, in which case, the second reserved port, namely, extension punt port 42 may be used.

According to various embodiments, fast path operations supported by extension KLM 30 can be defined in terms of flow definitions 32 and corresponding set of actions 34. In some embodiments, the flow definitions 32 and actions 34 may be determined by switch data path 28 when a first packet of a flow is processed in the default slow path. Such flow definitions 32 can be similar to the OpenFlow model of packet header fields, with support for wild-cards. In other embodiments, flow definitions 32 and actions 34 may be specified by the controller or a user.

Each of actions 34 may correspond to a feature that is offloaded, with the order of actions dictated by switch data path 28. Such architecture can support flows with multiple features to be offloaded and retain the feature processing order of the slow path. Actions 34 may be analogous to packet forwarding module stages, with the major distinction that actions 34 are configured on a per-flow basis unlike stages, which are applied either on a global, or a per-port basis. Actions 34 once configured on a flow may be applied unconditionally, without the need for per packet parsing. However, in some embodiments, actions 34 may be configured to be conditional on deep packet fields (e.g. an action handler could test a TCP flag and decide to drop the packet instead of defining two separate flows).

An action definition may be configured for actions 34 that are to be offloaded. The action definitions may be enabled by extension module API 36. Action definitions can include an action ID to an appropriate offload subroutine (e.g., OFFLOAD_ACTIONS) defined in a suitable offload library (e.g., PLATFORM_OFFLOAD.H). The action ID may be referenced by both the slow path (e.g., by switch data path 28) as well as by extension KLM 30. Action definitions can also include an action setup function that can collect feature data for the action to be executed in the fast path.

Actions 34 may be invoked with the feature's action ID (e.g., by invoking appropriate subroutines such as REGISTER_ACTION, which registers the action and generates an action ID in the offload library). In some embodiments, the feature data may be collected during slow path processing in flow record 44. Subsequently, the appropriate offload subroutine may offload actions 34 (in an ordered list in flow record 44) to extension KLM 30. Within extension KLM 30, the offload subroutine may call a registered setup function with a pointer to the feature data.

Switch data path 28 can maintain flow database 38 comprising offloaded flows (e.g., flows offloaded for actions to extension KLM 30), with support for retrieval by one or more header fields. For example, lookups in flow database 38 may be based on a fixed set of header fields with limited support for wild cards. The header fields may be consistent with the packet forwarding module context of virtual switch 12, with wild card support to allow any lazy parsing strategy adopted by the packet forwarding module. (The packet forwarding module may perform queuing of packets in virtual switch 12).

In various embodiments, flow database 38 may not make any distinction between EIFs and EEFs. Any such distinction may be provided by appropriate header fields. For example, if there is no change to the header fields of the packet as a result of packet processing, then EEF ID may exactly match EIF ID. In some embodiments, flow database 38 may maintain a hash table of offloaded flows within the packet forwarding module of switch data path 28. As the flow may be defined by a predetermined set of packet header fields, with an associated mask that allows wildcarding of some of the header fields, an appropriate mask may be configured from the HEADERS_USED field maintained by the packet forwarding module. In such embodiments, flow definitions 32 may be valid after the packet forwarding module has been run on the packet.

Extension KLM 30 may maintain list of offloaded flows 46, for example, indexed by the flow ID. Extension KLM 30 may retrieve the flow ID from the DMAC field of the received packet and obtain flow record 44 using the flow ID as an index. After the configured actions are performed by the corresponding registered action handlers in ingress packet processing module 48, the packet may be sent back to OVS KLM 24 on extension port 40.

In some embodiments, offloaded flows may be deleted based on a predetermined life-time. The life-times may be maintained within switch data path 28 and switch data path 28 may initiate expiration of the offloaded flows based on the life-time. The predetermined life-time may be measured using an appropriate timer. When a flow expires (e.g., life-time exceeds a preconfigured threshold on the timer), the flow may be removed from flow database 38 and deleted from list of offloaded flows 46 in extension KLM 30. In order to avoid unwanted transient flow misses, life-times of the offloaded flows may be carefully chosen relative to the life-times of the corresponding OVS flows. In some embodiments, offloaded flow-lifetime may be computed as a sum of the OVS flow life-time and a constant for EIFs, and a difference of the OVS flow life-time and the constant for EEFs, for example, to ensure that the EIF may not go missing (e.g., prematurely deleted) within extension KLM 30, and the EEF may not go missing within the OVS.

According to some embodiments, in fast path processing, the packet may retain the original flow ID and may be sent to OVS KLM 24 with the same flow-id at the end of the action chain processing based on the action taken on the packet. Sometimes, the action may result in a change of the flow ID after the action processing within encapsulation KLM 30. For example, an encapsulation action function may update the flow ID and return a new flow ID for the EEF. The original flow ID may be stored as part of the encapsulation action's per-flow configuration data, for example, in a mapping from the incoming flow ID to the outgoing flow ID.

The action subroutine may maintain sufficient data and logic to determine the flow ID after the decapsulation, as the mapping may not be necessarily direct. Depending on the size of the look up, an appropriate linear search, hash look up or other scheme may be employed to determine the flow ID after decapsulation. In some cases where multiple actions may be performed on the packet, multiple layers of encapsulation or decapsulation (or a combination) may be provided. Logically, each encapsulation or decapsulation layer can result in a new flow ID. However, such additional layers are internal to encapsulation KLM 30 and opaque to the OVS as the OVS only sees the original incoming header and the corresponding outgoing header. Thus, the OVS sees one ingress flow ID (EIF ID) and one egress flow ID (EEF ID).

In some embodiments, packet cloning may be performed in extension KLM 30 to support multicast and/or broadcast with differing features on each port or switch port analyzer (SPAN), wherein packet mirroring is performed. Unknown flooding may be handled by the slow path, rather than the fast path in some embodiments. To offload cloning, multiple egress flows corresponding to one ingress flow may be created. Because cloning in the slow path would result in multiple software contexts, multiple egress flows may be created in the fast path by including a clone ID (e.g., derived from the destination ID) as part of the flow key. During cloning, a clone action in the fast path may create the desired number of packet clones and assign them the corresponding egress flow IDs using the clone ID.

Turning to the infrastructure of communication system 10, the network topology can include any number of servers, virtual machines, switches (including virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of virtual machines, and switches within the broad scope of the present disclosure.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). The network infrastructure may represent any type of networks, including Internet, enterprise networks, cloud networks, etc.

According to various embodiments, virtual switch 12 may be a software program on a physical server or other computing device. In some embodiments, virtual switch 12 may be provisioned across multiple servers (e.g., distributed virtual switch), with multiple virtual Ethernet modules (VEM) and virtual network interfaces and ports to connect multiple virtual machines 14. Various physical configurations of virtual switch 14 can be implemented within the broad scope of the embodiments. Each server may be provisioned with one or more VEMs connecting multiple virtual machines 14 hosted on the server; the servers may communicate through one or more physical switches that may be managed as a single virtual switch (along with the VEMs) connecting substantially all virtual machines 14 in the network.

In some embodiments, extension KLM 30 can appear as a virtual machine to virtual switch 12. In other embodiments, extension KLM 30 can form part of virtual switch 12, as indicated in the FIGURE. In a general sense, OVS KLM 24, OVS user space daemon 26, switch data path 28 and extension KLM 30 are processes executing in a computing device (e.g., server, switch, computer, etc.). Logic embodied in code pertaining to extension KLM 30, switch data path 28, OSV KLM 24, and OSV user space daemon 26 may be provisioned as one or more software modules in a non-transitory tangible medium of a central management server in some embodiments. As the code executes in an appropriate virtual machine as part of the operation of virtual switch 12, an instance each of extension KLM 30, switch data path 28, OSV KLM 24 and OSV user space daemon 26 may substantially simultaneously execute in appropriate user space 20 and kernel space 22 of memory element 16 of the server(s) on which the code is executing.

In some embodiments, multiple instances of extension KLM 30, switch data path 28, OSV KLM 24 and OSV user space daemon 26 may be active at any period of time within the network managed by virtual switch 12. In other embodiments, merely one instance each of extension KLM 30, switch data path 28, OSV KLM 24, and OSV user space daemon 26 may be active in the network, and manage substantially all traffic flowing through the network. Embodiments of communication system 10 may retain binary compatibility with OpenFlow switches, such as OVS, avoiding maintenance and administrative overhead. Moreover, embodiments of communication system 10 may allow flexible fast path offloading of features based on particular needs.

Figures 2, 3:
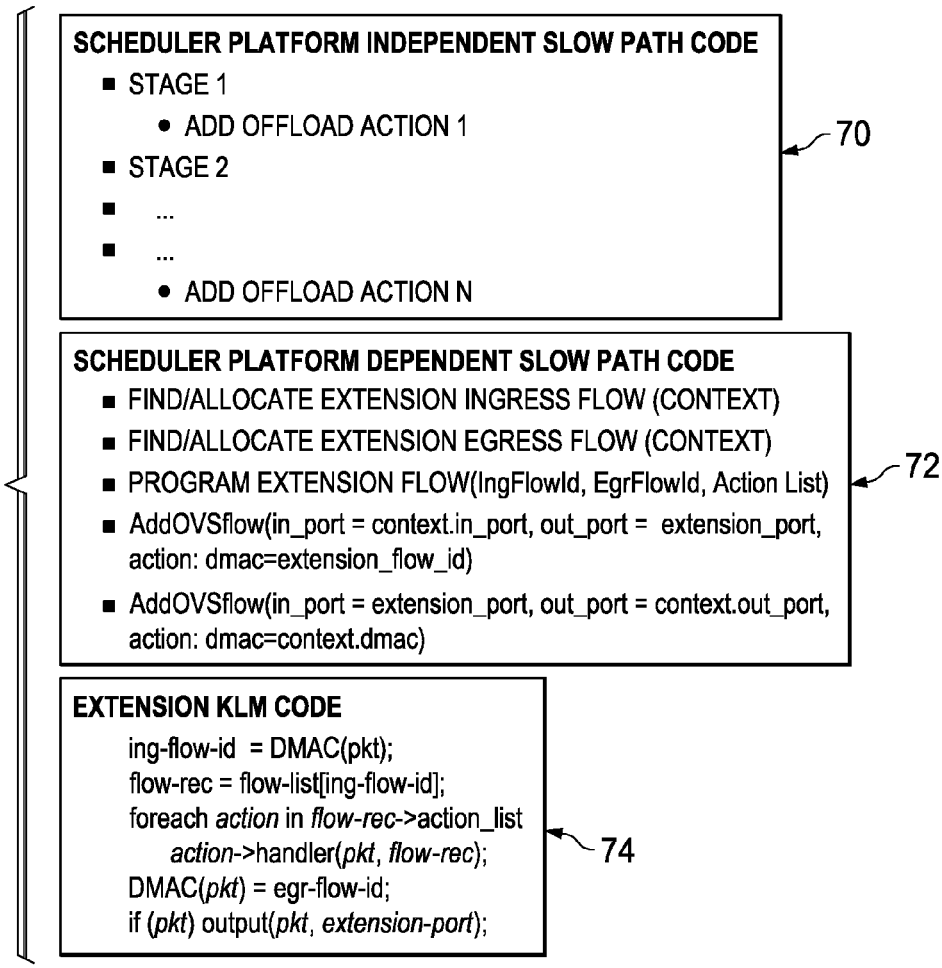
FIG. 2 is a simplified diagram illustrating example details of the communication system in accordance with one embodiment.
FIG. 3 is a simplified diagram illustrating other example details of the communication system in accordance with an embodiment.

Turning to FIG. 2, FIG. 2 is a simplified diagram illustrating example code that may be executed in some embodiments of communication system 10. Offloaded flows may be created by the slow path code in switch data path 28; the slow path code can comprise platform independent code (e.g., code 70) and platform dependent code (e.g., code 72). For example, feature offload may be a platform dependent function, while the features being offloaded may be platform independent. In various embodiments, extension module API 36 may be configured such that features can make API calls in a platform independent way. Platform independent code (e.g., code 70) may specify global actions (e.g., forward, encapsulate, etc.) that may be generic or uniform across multiple platforms. On the other hand, platform dependent code (e.g., code 72) may be specific to processes in a specific platform (e.g., context dependent processes, application specific actions, etc.).

Example code 74 lists code executed by extension KLM 30. Example code 74 may sets the EIF flow ID to be the value of the DMAC address in a header of the received packet; retrieves flow record 44 based on the flow ID; and transfers to an action handler to perform a relevant action on the packet. After the action(s) is performed, the DMAC address is set to the EEF ID, and the packet is output through extension port 40, according to example code 74.

Turning to FIG. 3, FIG. 3 is a simplified diagram illustrating an example set of header fields and bit lengths used in a flow lookup key according to embodiments of communication system 10. According to some embodiments, the flow lookup key may comprise a 232 bit key; flow database 38 may permit a key length of 256 bits. Any other suitable key length supported by flow database 38 may be used according to the broad scope of the embodiments.

Turning to FIG. 4, FIG. 4 is a set of APIs 78 supported by flow database 38 according to an embodiment of communication system 10. APIs 78 may be configured to allocate (e.g., EFDB_ALLOC_FLOW), find (e.g., EFDB_FIND_FLOW), and delete (e.g., EFDB_DELETE_FLOW) a flow ID. The flow ID may be an integer in some embodiments; in other embodiments, the flow ID may be an 8 bit unsigned integer of the flow key. Various other numerical and alphanumerical designations are possible for the flow ID within the broad scope of the embodiments. In some embodiments, a value of −1 may be returned if the flow ID is not found in flow database 38.

Turning to FIG. 5, FIG. 5 is a set of APIs 80 supported by the extension module API 36 according to an embodiment of communication system 10. APIs 80 may be configured to offload actions 34 corresponding to the flow ID queried by extension KLM 30 as provided in the mapping between flow definitions 32 and actions 34 in switch data path 28. APIs 80 may be configured to generate a list of actions 34 into flow record 44. For example, function ACTION_LIST_S may generate a list of length LIST_LEN, with a payload specifying the actions to be included in the list. APIs 80 can also include adding (e.g., SW_EXTN_ADD_FLOW) flows into flow database 38, deleting flows (e.g., SW_EXTN_DEL_FLOW) from flow database 38, and retrieving flows (e.g., SW_EXTN_GET_FLOW) from flow database 38.

Turning to FIG. 6, FIG. 6 is a set of APIs 82 supported by the extension module API 36 according to an embodiment of communication system 10. Example APIs 82 include subroutines that specify one or more actions 34. For example, action 34 may specify that the packet may be modified and a new flow ID returned (e.g., N1K_FLOW_NEW); in another example, action 34 may specify that the packet may not be modified, and the next action on the list may be performed (e.g., N1K_FLOW_CONTINUE); in yet another example, the packet may be punted to the slow path (e.g., N1K_FLOW_PUNT); in yet another example, the packet may be dropped (e.g., N1K_FLOW_DROP); etc.

Figure 7:
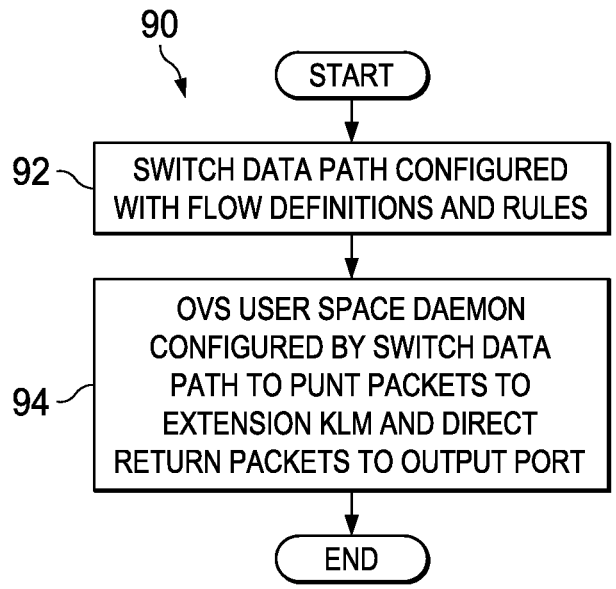
FIG. 7 is a simplified flow diagram illustrating example operations that may be associated with an embodiment of the communication system.

Turning to FIG. 7, FIG. 7 is a simplified flow diagram illustrating example operations 90 that may be associated with configuring switch data path 28 according to an embodiment of communication system 10. At 92, switch data path 28 may be configured (e.g., by user, system administrator, controlling/configuring/management software, etc.) with flow definitions 32 and corresponding actions 34. At 94, switch data path 28 may configure OVS user space daemon 26 to punt packets to extension KLM 30 over extension port 40 and direct return ports from extension KLM 30 over extension port 40 to a suitable output port.

Accordingly, OVS user space daemon 26 may direct OVS KLM 24 to rewrite the DMAC address value of the packet with the EIF ID and send the packet to extension KLM 30 over extension port 40. In some embodiments, the DMAC address value may be stored in an appropriate data structure and mapped to the flow appropriately. Likewise, OVS user space daemon 26 may direct OVS KLM 24 to rewrite the DMAC address value of the return packet (having the EEF ID) with the original DMAC address value from the mapping stored therein, and send the packet out to its destination through the output port of virtual switch 12.

Figure 8:
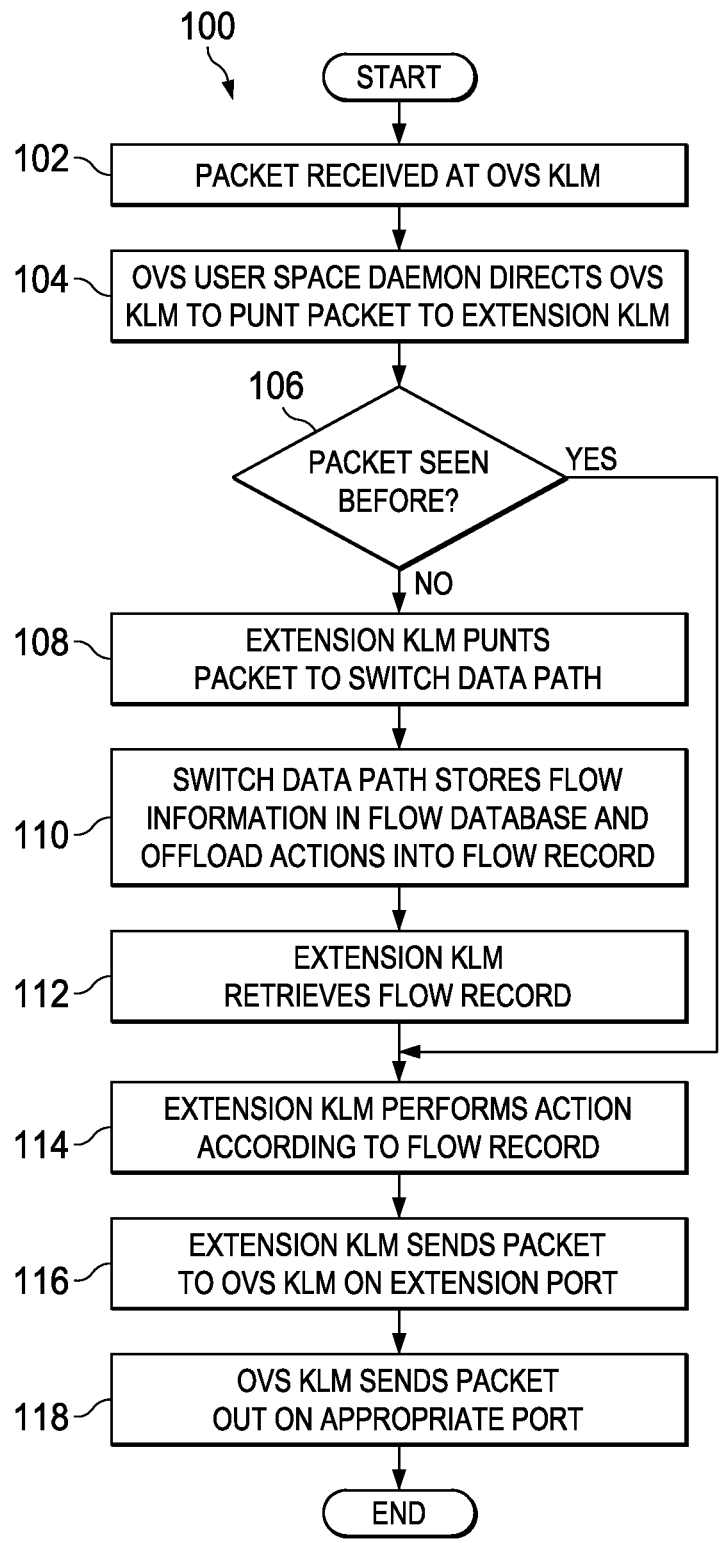
FIG. 8 is a simplified flow diagram illustrating other example operations that may be associated with another embodiment of the communication system.

Turning to FIG. 8, FIG. 8 is a simplified flow diagram illustrating example operations 100 that may be associated with embodiments of communication system 10. At 102, a packet may be received at OVS KLM 24 of virtual switch 12. At 104, OVS user space daemon 26 may direct OVS KLM 24 to punt the packet to extension KLM 30. At 106, a determination may be made at extension KLM 30 whether the packet has been seen before. If the packet has not been seen before (e.g., it is first of a flow), at 108, extension KLM 30 may punt the packet to switch data path 28. At 110, switch data path 28 may store flow information in flow database 38 and offload actions 34 into flow record 44.

At 112, in some embodiments, extension KLM 30 may retrieve the flow ID from the packet and obtain flow record 44 from switch data path 28. In alternate embodiments, switch data path 28 may offload flow record 44 to extension KLM 30.

At 114, extension KLM 30 may perform actions 34 according to flow record 44. At 116, extension KLM 30 may send the packet to OVS KLM 24 on extension port 40. At 118, OVS KLM 24 may send the packet out on an appropriate (e.g., output) port of virtual switch 12. Turning back to 106, if the packet has been seen before, the operations may step to 114, at which extension KLM 30 may perform actions 34 according to flow record 44 (saved in extension KLM 30 appropriately) and the operations may continue thereon as indicated.

Figure 9:
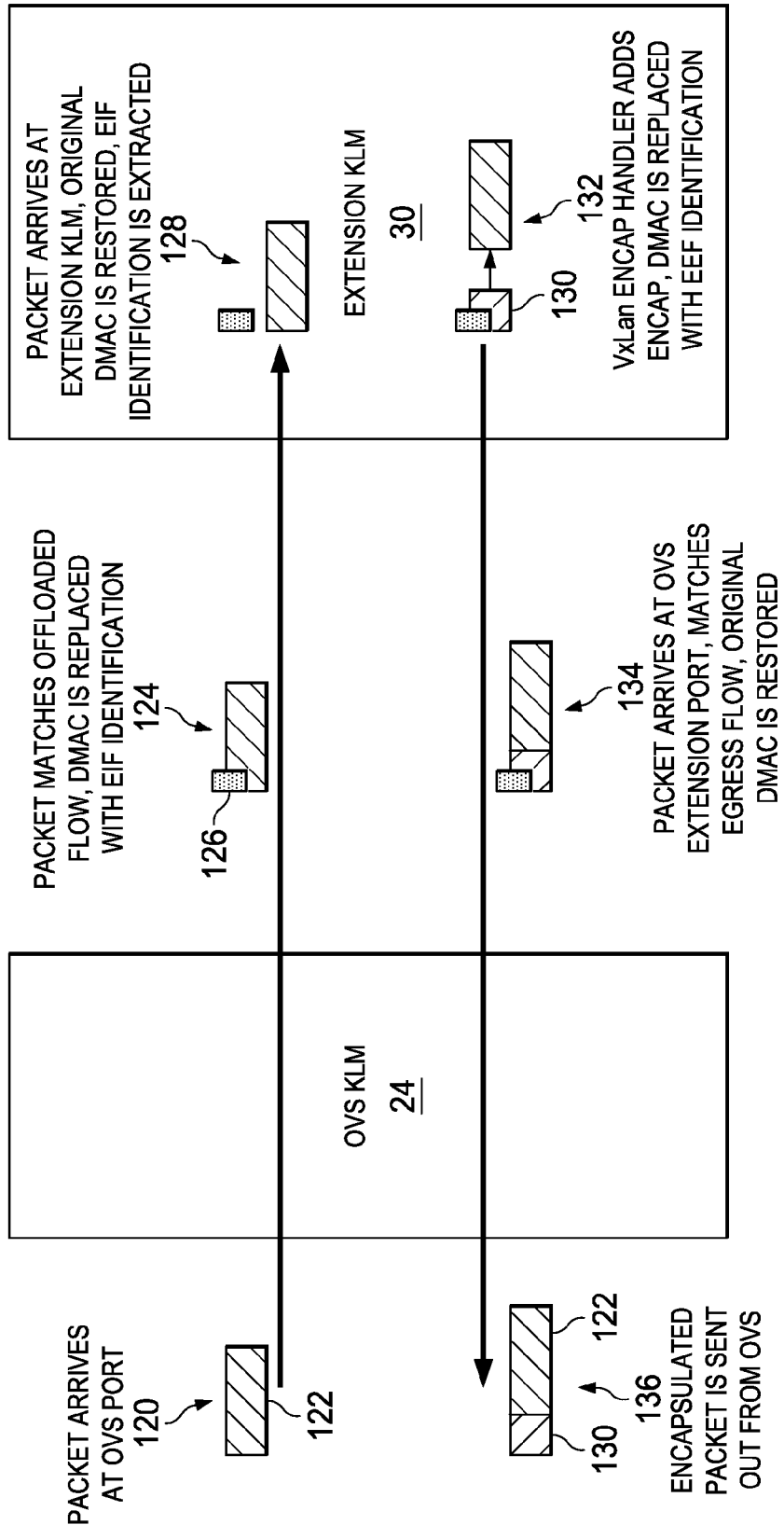
FIG. 9 is a simplified diagram illustrating details of example details and example operations that may be associated with an embodiment of the communication system.

Turning to FIG. 9, FIG. 9 is an example implementation of VXLAN encapsulation according to an embodiment of communication system 10. A packet 122 may arrive at an OVS port (or incoming port of virtual switch 12, which may be managed by the OVS). At 124, OVS KLM 24 may determine that packet 122 is to be punted to extension KLM 30 and may rewrite the DMAC address value with the EIF ID 126. Because the packet header would modified by the VXLAN subroutine, the original packet header value may be saved in an appropriate data structure in the OVS before sending packet 122 to extension KLM 30.

At 128, extension KLM 30 may restore the original DMAC address value, and extract the EIF ID. A VXLAN encapsulation header 130 may be added and the DMAC address value replaced with EEF ID at 132. The encapsulation of VXLAN packets may be performed by an appropriate header update subroutine (e.g., L2LISP_UPDATE_HEADER), for example, in platform independent code (e.g., code 70). According to a specific embodiment, inside the header update subroutine, a platform dependent encapsulation function (e.g., VXLAN_ENCAP_FASTPATH) may be invoked to perform at least the following actions: 1) save the original packet header fields and the new header fields in a platform dependent data structure; and 2) invoke the appropriate offload subroutine (e.g., ADD_OFFLOAD_ACTION(EXTN_VXLAN_ENCAP, ENCAP_DATA)) for offloading the action (e.g., VXLAN in extension KLM 30). The offload subroutine may depend on suitable encapsulation data (e.g., ENCAP_DATA), which, in the example case of VXLAN, can be the VXLAN header that the header update subroutine adds to packet 122. The encapsulation data may be interpreted appropriately by a registered action subroutine for VXLAN in extension KLM 30.

Moreover, the offload subroutine may add the action to a pending list of actions in switch data path 28 and/or extension KLM 30. The action may be programmed by switch data path 28 in extension KLM 30 at the end of a packet forwarding module run, for example, by platform independent code (e.g., code 70). At the end of the packet forwarding module run, a common platform dependent code (e.g., code 72) may perform at least the following actions: 1) allocate EIF ID based on the original header; 2) allocate EEF ID based on the new header (after VXLAN processing); 3) invoke extension APIs (from extension module API 36) to program the list of offload actions (and generate flow record 44); 4) add an OVS flow for ingress, with DMAC modification action to replace the DMAC address value with the EIF ID; and 5) add an OVS flow for egress, with DMAC modification action to replace the DMAC address value with EEF.

In some cases, the EIF ID may differ, but the EEF ID may be the same as previous flows. For example, consider a new VXLAN flow with a new packet header, arriving at virtual switch 12. Packet 122 may be punted to switch data path 28 in the slow path (e.g., as it has a heretofore unseen header). If packet 122 is destined to the same VM 14 (or other destination) as a previously encountered flow (currently configured in flow database 38 and not yet expired), the encapsulation header for the new flow may be the same as the encapsulation header for the previous flow (e.g., if the encapsulation header is based on the packet's destination). In such case, the EIF ID for the flow may be new (based on the (new) header), whereas the EEF ID may be based on the encapsulation header computed from the previous flow). At 134, packet 122 may arrive at extension port 40 on OVS KLM 24. The original DMAC address value may be restored to packet 122. At 136, packet 122 with VXLAN header 130 may be sent to its destination through a suitable output port on virtual switch 12.

Figure 10:
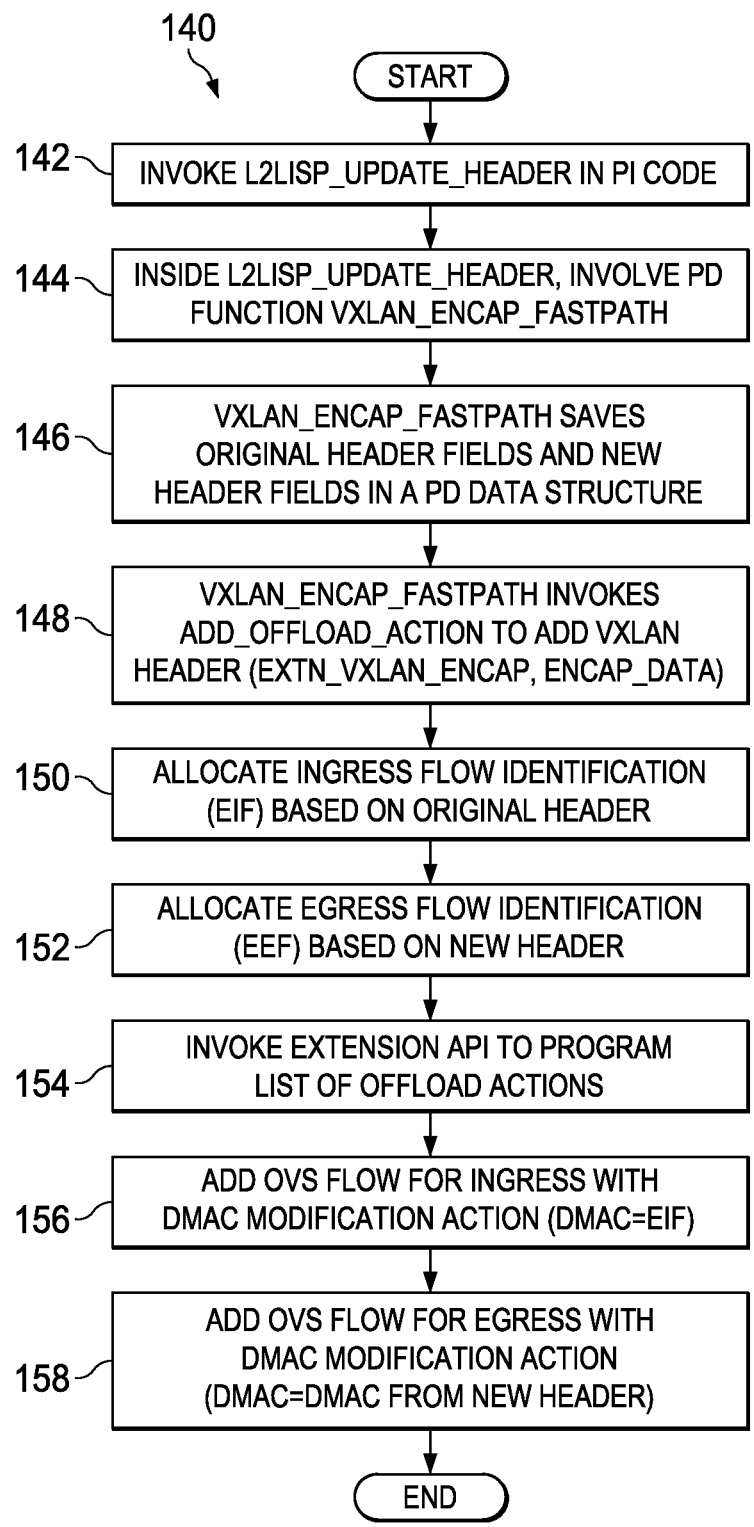
FIG. 10 is a simplified flow diagram illustrating yet other example operations that may be associated with another embodiment of the communication system.

Turning to FIG. 10, FIG. 10 is a simplified flow diagram illustrating example operations 140 that may be associated with VXLAN encapsulation of a packet executed by switch data path 28 according to an embodiment of communication system 10. At 142, an update header subroutine (e.g., L2LISP_UPDATE_HEADER) in platform independent code (e.g., code 70) may be invoked. At 144, inside the update header subroutine, platform dependent VXLAN function for encapsulation (e.g., VXLAN_ENCAP_FASTPATH) may be involved. At 146, the platform dependent function may save the original header fields and new header fields in a platform dependent data structure. At 148, the platform dependent VXLAN function may invoke an offload subroutine (ADD_OFFLOAD_ACTION) to add a VXLAN header including the encapsulation data (ENCAP_DATA), which is included in the VXLAN header.

At 150, the EIF ID based on the original header may be allocated. At 152, EEF ID based on the new header may be allocated. At 154, extension APIs may be invoked to program list of actions 34. At 156, an OVS flow for ingress with DMAC modification to EIF ID may be added. At 158, another OVS flow for egress with DMAC modification to DMAC from new header (or EEF) may be added. Subsequently, the information may be included in flow record 44 and/or other communication between switch data path 28 and extension KLM 30.

Figure 11:
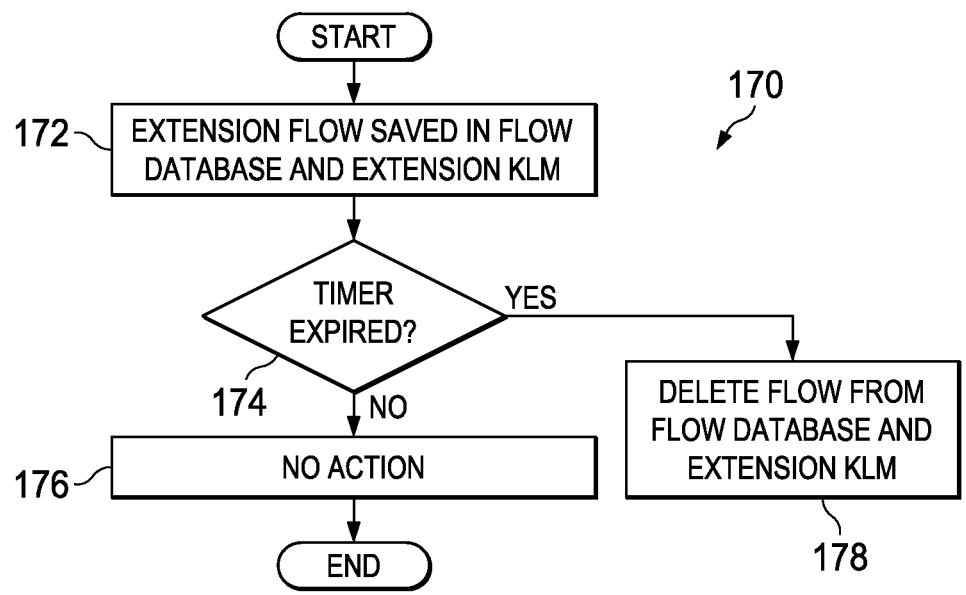
FIG. 11 is a simplified flow diagram illustrating yet other example operations that may be associated with another embodiment of the communication system.

Turning to FIG. 11, FIG. 11 is a simplified flow diagram illustrating example operations 170 that may be associated with expiring flows according to embodiments of communication system 10. At 172, offloaded flows (e.g., flows offloaded to extension KLM 30) may be saved in flow database 30 and extension KLM 30 (e.g., in list of offloaded flows 46). At 174, a determination may be made whether a preconfigured timer has expired. If the timer has not expired, no action is performed at 176. If the timer has expired, at 178, the flow may be deleted from flow database 38 and from list of offloaded flows 46 in extension KLM 30.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, code that executes switch data path 28 and extension KLM 30. In some embodiments, one or more of these features may be implemented in hardware, provided external to these elements, or consolidated in any appropriate manner to achieve the intended functionality. The various elements (e.g., virtual switch 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, virtual switch 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 16) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 18) could transform an element or an article (e.g., data) from one state or thing to another state or thing. In another example, the activities outlined herein may be implemented with fixed logic or programmable logic (e.g., software or computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a packet at an Open vSwitch (OVS) kernel space component of a virtual switch configured for an Open Flow protocol from a user space component of the virtual switch;
   directing the packet on an extension port to an extension kernel module (KLM) executing in the kernel space, the KLM performing the steps of:
      fast path processing on the packet under control of a switch data path in the user space;
      moving the packet from the fast path in the kernel space to the switch data path in the user space if the packet is a first one of a flow, wherein the switch data path stores flow information in a flow database and offload actions in a flow record;
      retrieving a flow ID from the packet and obtain the flow record from the switch data path;
      executing a list of actions according to the flow record if the packet is a second one of a flow;
      sending the packet on the extension port for a subsequent delivery to its destination from an output port of the virtual switch.

2. The method of claim 1, wherein a destination media access control (DMAC) address value in a header of the packet is replaced with an extension ingress flow (EIF) identifier (ID) when the packet is sent from the OVS component to an extension kernel loadable module (KLM) that performs the fast path processing, wherein the EIF ID is replaced with an extension egress flow (EEF) ID when the packet is sent back to the OVS component from the extension KLM, and wherein the EIF ID is replaced with the DMAC address value when the packet is sent to its destination from the output port of the virtual switch.

3. The method of claim 1, wherein the method further comprises at least one activity selected from a group consisting of: compiling flow statistics, generating a log file, and registering actions against specific action identifiers.

4. The method of claim 1, wherein the OVS component comprises an OVS KLM executing in kernel space of the virtual switch.

5. The method of claim 4, wherein an OVS user space daemon executing in user space of the virtual switch communicates with the OVS KLM and the switch data path, wherein the OVS user space daemon is configured by the switch data path to force the OVS KLM to send the packet for fast path processing on the extension port, and to send the packet received on the extension port to the packet's destination.

6. The method of claim 1, wherein the switch data path comprises a flow database of offloaded flows with support for retrieval by at least one header field.

7. The method of claim 6, wherein the offloaded flows are deleted from the flow database upon expiry of a predefined timer.

8. The method of claim 1, wherein the switch data path comprises an extension module application programming interface (API) that can allow feature specific actions to be defined and configured on a per-flow basis.

9. The method of claim 1, wherein an extension punt port permits moving of packets back to the OVS component without fast path processing.

10. One or more non-transitory tangible media that includes instructions for execution, which when executed by a processor, is operable to perform operations comprising:
  receiving a packet at an Open vSwitch (OVS) kernel space component of a virtual switch configured for an Open Flow protocol from a user space component of the virtual switch;
  directing the packet on an extension port to an extension kernel module (KLM) executing in the kernel space, the KLM performing the steps of:
    fast path processing on the packet under control of a switch data path in the user space;
    moving the packet from the fast path in the kernel space to the switch data path in the user space if the packet is a first one of a flow, wherein the switch data path stores flow information in a flow database and offload actions in a flow record;
    retrieving a flow ID from the packet and obtain the flow record from the switch data path;
    executing a list of actions according to the flow record if the packet is a second one of a flow; and
  sending the packet on the extension port for a subsequent delivery to its destination from an output port of the virtual switch.

11. The media of claim 10, wherein a DMAC address value in a header of the packet is replaced with an EIF ID when the packet is sent from the OVS component to an extension KLM that performs the fast path processing, wherein the EIF ID is replaced with an EEF ID when the packet is sent back to the OVS component from the extension KLM, and wherein the EIF ID is replaced with the DMAC address value when the packet is sent to its destination from the output port of the virtual switch.

12. The media of claim 10, wherein the OVS component comprises an OVS KLM executing in kernel space of the virtual switch.

13. The media of claim 12, wherein an OVS user space daemon executing in user space of the virtual switch communicates with the OVS KLM and the switch data path, wherein the OVS user space daemon is configured by the switch data path to force the OVS KLM to send the packet for fast path processing on the extension port, and to send the packet received on the extension port to the packet's destination.

14. An apparatus, comprising:
  a memory element for storing data comprising a user space and a kernel space;
  a switch data path configured to execute in the user space;
  an executable extension kernel module (KLM) configured to execute in the kernel space; and
  a processor, wherein the processor executes instructions associated with the data, wherein the process and the memory element cooperate, such that the apparatus is configured for:
    receiving a packet at an Open vSwitch (OVS) kernel space component of a virtual switch configured for an Open Flow protocol from a user space component of the virtual switch;
    directing the packet on an extension port to an extension kernel module (KLM) executing in the kernel space, the KLM performing the steps of:
      fast path processing on the packet under control of a switch data path in the user space;
      moving the packet from the fast path in the kernel space to the switch data path in the user space if the packet is a first one of a flow, wherein the switch data path stores flow information in a flow database and offload actions in a flow record;
      retrieving a flow ID from the packet and obtain the flow record from the switch data path;
      executing a list of actions according to the flow record if the packet is a second one of a flow;
    sending the packet on the extension port for a subsequent delivery to its destination from an output port of the virtual switch.

15. The apparatus of claim 14, wherein a DMAC address value in a header of the packet is replaced with an EIF ID when the packet is sent from the OVS component to the extension KLM that performs the fast path processing, wherein the EIF ID is replaced with an EEF ID when the packet is sent back to the OVS component from the extension KLM, and wherein the EIF ID is replaced with the DMAC address value when the packet is sent to its destination from the output port of the virtual switch.

16. The apparatus of claim 14, wherein the OVS component comprises an OVS KLM executing in kernel space of the virtual switch.

17. The apparatus of claim 16, wherein an OVS user space daemon executing in user space of the virtual switch communicates with the OVS KLM and the switch data path, wherein the OVS user space daemon is configured by the switch data path to force the OVS KLM to send the packet for fast path processing on the extension port, and to send the packet received on the extension port to the packet's destination.

* * * * *